(12) United States Patent
Morrison et al.

(10) Patent No.: US 9,495,271 B2
(45) Date of Patent: Nov. 15, 2016

(54) STATISTICAL POWER INDICATION MONITOR FOR PURPOSE OF MEASURING POWER CONSUMPTION

(71) Applicant: FREESCALE SEMICONDUCTOR, INC., Austin, TX (US)

(72) Inventors: Gary R. Morrison, Austin, TX (US); James G. Gay, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 247 days.

(21) Appl. No.: 14/167,092

(22) Filed: Jan. 29, 2014

(65) Prior Publication Data

US 2015/0212917 A1    Jul. 30, 2015

(51) Int. Cl.
*G06F 11/30* (2006.01)
*G06F 11/36* (2006.01)

(52) U.S. Cl.
CPC ....... *G06F 11/3062* (2013.01); *G06F 11/3003* (2013.01); *G06F 11/3096* (2013.01); *G06F 11/36* (2013.01); *G06F 2201/865* (2013.01); *G06F 2201/88* (2013.01)

(58) Field of Classification Search
CPC ........... G01R 31/3187; G06F 17/5004; G06F 7/584; G06F 7/582
USPC ............................ 713/340; 701/301; 375/371
See application file for complete search history.

(56) References Cited

U.S. PATENT DOCUMENTS

| | | | | |
|---|---|---|---|---|
| 4,800,499 A * | 1/1989 | Ina | ........................ | F02D 41/28 123/480 |
| 6,483,290 B1 | 11/2002 | Hemminger et al. | | |
| 6,609,208 B1 * | 8/2003 | Farkas | ...................... | G06F 1/28 713/320 |
| 7,802,159 B1 * | 9/2010 | Chakravarty | .. | G01R 31/318552 714/731 |
| 8,010,824 B2 | 8/2011 | Naffziger | | |
| 2005/0261834 A1 * | 11/2005 | Szajnowski | .............. | H03K 3/84 701/301 |
| 2006/0165205 A1 * | 7/2006 | Dally | ...................... | H03M 9/00 375/371 |
| 2007/0162806 A1 * | 7/2007 | Matsumoto | ............. | G06F 17/15 714/728 |
| 2007/0245161 A1 * | 10/2007 | Shaw | .................... | G06F 1/3203 713/300 |
| 2008/0120676 A1 * | 5/2008 | Morad | ............. | H04N 21/42607 725/127 |
| 2008/0195907 A1 * | 8/2008 | Wittke | ............... | G01R 31/3187 714/739 |
| 2011/0093733 A1 | 4/2011 | Kruglick | | |
| 2011/0301889 A1 | 12/2011 | Naffziger et al. | | |
| 2012/0110351 A1 | 5/2012 | Raju et al. | | |
| 2012/0124560 A1 * | 5/2012 | Indukuru | .............. | G06F 8/4442 717/127 |
| 2013/0117596 A1 * | 5/2013 | Furukawa | ........... | G06F 11/3409 713/340 |

OTHER PUBLICATIONS

Najm, Farid N. "Power Estimation Techniques for Integrated Circuits." ICCAD '95 Proceedings of the 1995 IEEE/ACM International Conference on Computer-aided Design. pp. 492-499, IEEE Computer Society Washington, DC, USA.

* cited by examiner

*Primary Examiner* — Thomas Lee
*Assistant Examiner* — Santosh R Poudel

(57) ABSTRACT

A statistical power indication monitor including a random pattern generator that generates random sample assertions of a sample signal, a total counter that counts a total number of the random sample assertions within a sample time interval, detect logic that provides a detection signal for each power indication signal that is asserted coincident with the sample signal, and counter logic that counts a number of assertions of each detection signal during the sample time interval. The assertion count of each power indication signal divided by the total count provides a statistical indication of power consumption of a corresponding system. A user may use the statistical monitoring information to adjust system or application operation. The random pattern generator may be a pseudo-random pattern generator including a linear feedback shift register and may have programmable seed and sample rate.

20 Claims, 3 Drawing Sheets

STATISTICAL POWER INDICATION MONITOR FOR PURPOSE OF MEASURING POWER CONSUMPTION

BACKGROUND OF THE INVENTION

Field of the Invention

The present disclosure relates generally to power monitoring, and more specifically to a statistical power indication monitor (SPIM) that statistically monitors power indication signals that affect power consumption.

Description of the Related Art

Low power operation is a strong market differentiator for electronic applications, especially those that are battery-powered. Many applications are therefore designed to meet a predetermined power budget based on market factors, such as weight, size and cost, among other possible factors. After fabrication, an application is usually tested to determine whether it meets the predetermined or estimated power budget criterion. Many applications, however, even with the most careful design of task structure and scheduling, initially exceed the target power budget. Although there are well-known means of measuring overall power consumption, it is often difficult to identify the specific sources or causes of excessive power.

A significant number factors causing or otherwise contributing to excessive power consumption may be involved, many of which are not easily identifiable or detectable in a code trace or the like. Since the components of a design which consume the most power may vary during normal operation, power consumption should usually be assessed over relatively long spans of operation to identify specific sources or causes. Most development and/or analysis tools, however, tend to provide detail on specific moments of operation.

Conventional techniques are known that sample, often periodically, various circumstances by asserting CPU interrupts and having the interrupt routines gather statistics. Probably the most common usage of sampling is for code profiling. Conceptually, this technique could be adapted to gather statistics on, for example, a flash-memory programming power supply being turned on. This conventional approach, however, can have huge drawbacks in that the measurement functions themselves change what is being measured, thereby invalidating the measurements. For example, by asserting an interrupt, the target CPU goes into full-power mode, thereby making it impossible to gather statistics on that pivotal power-consumption factor. The interrupt routine modifies cache content causing more cache misses than would normally occur. Also, since the interrupt routine takes time to execute, samples cannot be taken very often. Furthermore, many factors that affect power consumption require access to low-level hardware signals, not typically visible to a CPU. Another drawback to these conventional techniques is that they cannot gather statistics while interrupts are masked, which is often when high-power activities are performed.

Generally, the specific causes of excessive power consumption are not easily determinable using conventional techniques.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

The present inventors have recognized that monitoring certain key signals of an application can provide useful information for determining why an application is consuming more power than estimated. The present inventors have therefore developed a statistical power indication monitor that statistically monitors selected signals, referred to herein as power indication signals, that indicate high power circumstances during a selected time interval of application operation to identify potential causes of excessive power consumption. The statistical information may be used to identify the devices, components or systems that are consuming higher-than-anticipated power during operation. The determined statistical and identification information may then be used to adjust operation of the application in order to reduce or otherwise eliminate excessive power consumption, such as by modifying the controlling software.

Figure 1:
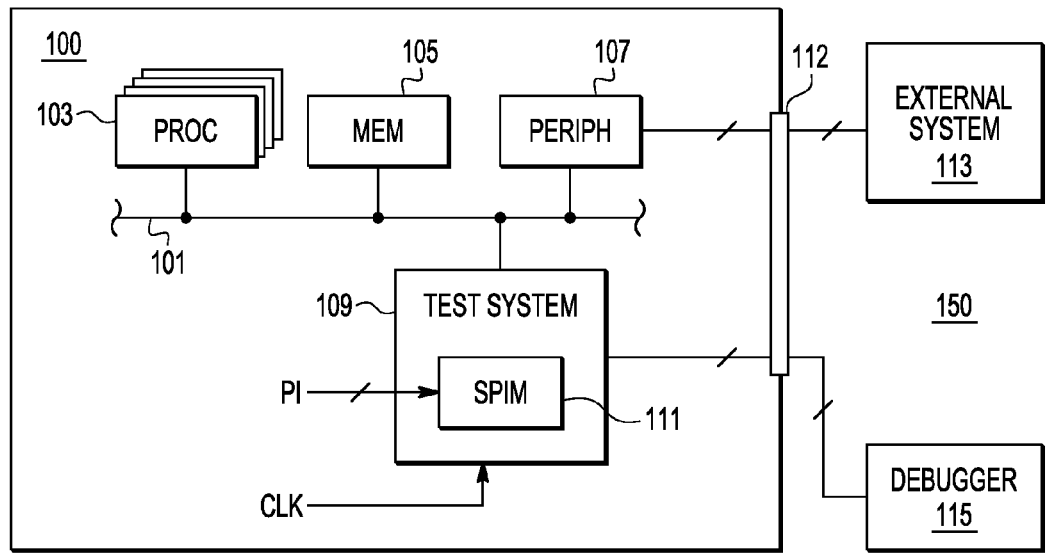
FIG. 1 is a simplified block diagram of an application including an integrated circuit (IC) and an external system, in which the IC includes a statistical power indication monitor implemented according to one embodiment.

FIG. 1 is a simplified block diagram of an application system 150, shown including an integrated circuit (IC) 100 and an external system 113, designed to perform a particular application. The IC 100 includes a statistical power indication monitor (SPIM) 111 implemented according to one embodiment. In the illustrated embodiment, the application system 150 includes the IC 100 coupled to an external system 113 via one or more input/output (I/O) pins of an I/O interface 112, in which the external system 113 may include any number or amount of external devices, such as peripherals or external memory. In one embodiment, the IC 100 is configured as a system-on-a-chip (SOC) configuration, although alternative configurations are contemplated. The IC 100 includes one or more processors 103 coupled to a memory system 105 and a peripheral interface 107, coupled together via a system interface 101. The IC 100 may include an internal test system 109 coupled to the system interface 101, in which the test system 109 includes the SPIM 111 as further described herein. The test system 109 may be configured to perform other test operations, such as boundary scan operations, debug operations, calibration operations, built-in self test operations, etc. A system clock signal CLK is shown provided to the test system 109 (and may be provided to the other components though not shown).

Each of the processor(s) 103 may be implemented in any suitable fashion, such as a central processing unit (CPU), a graphics processing unit (GPU), a digital signal processor (DSP), an I/O processor (IOP), or any other type of processing unit. The memory system 105 may include any combination of read-only (ROM) and random access (RAM) portions, and the RAM may include any suitable type or combination of static RAM (SRAM) and dynamic RAM (DRAM). Flash memory or flash alternatives like magneto-resistive or phase-change memory may also be included. The peripheral interface 107 provides suitable I/O logic and circuitry for interfacing any number of peripherals or I/O devices or other systems of the external system 113. The system interface 101 may be implemented in any suitable manner, such as a bus system or cross-bar system, and could alternatively also interface to the external system through the I/O interface 112, such as to control an external DRAM array.

The I/O interface 112 includes any number of pins for coupling to and interfacing the external system 113. The external system 113 generally includes the additional circuitry and functionality to fully implement the end product of the particular application. The external system 113 may include test functions or may otherwise include one or more test interfaces to control the test system 109 including the SPIM 111. The test system 109 may be self-contained in which it is configured to perform desired test functions, including those described herein. In the illustrated embodiment, however, an external test system, such as a debugger 115 as shown, may be coupled to the IC 100, such as via the I/O interface 112, to interface or otherwise control the test system 109 and the SPIM 111. An external system, such as the debugger 115, is a convenient way for power consumption to be probed without having to modify the system under test. The debugger 115 may be implemented in any suitable manner, such as based upon the Nexus industry standard. In one embodiment, one or more registers within the test system 109 and/or the SPIM 111 may be mapped into memory space to be accessed by the debugger 115 during test operations. Such registers may include test control registers and counter registers or the like as further described herein for controlling operations of the SPIM 111 including providing and retrieving test or monitoring information.

Several power integration (PI) signals of the IC 100 are provided to the SPIM 111 for power monitoring purposes as further described herein. Each PI signal is selected as a signal of interest indicative of high power usage when activated or turned on. Examples of possible PI signals include a processor full-power mode signal, multiple processor power signal, flash-programming supply voltage enable signal, flash write indication signal, cache-miss bus cycle in progress signal, direct memory access (DMA) controller in-operation signal, special purpose controller in-operation signal, power-domain activated signal, external bus access in progress signal, external I/O hardware control signal, one or more I/O pins indicating operation of external power-consuming devices, etc. Not all of these signals or pins may be monitored and other signals or pins may be selected depending upon the extent that they indicate power usage.

A processor full power mode signal indicates whether a given processor core (configured as a CPU, GPU, DSP, IOP, etc., as previously described) is in its fully power-up state and/or operating in full frequency clock mode. In the full power state, a processor core may consume thousands of times more power than when turned off or in a sleep mode. A fully powered CPU may draw multiple milli-amperes (mA) of current versus one or more micro-amperes (µA) when in a low power or sleep mode. Although gathering or monitoring statistics for lower power modes may provide useful information, the full-power, full frequency mode provides a significant indication of higher power usage of an application.

A multiple processor power signal may be implemented with gating or logic (e.g., set of logic AND gates and an OR gate or other suitable logic, not shown) to determine when more than one processor or CPU is fully powered at the same time. For example, for a 4 processor system, a power indicator may indicate when any 2 or more, or any 3 or more, or even when all of the processors are operating in their full power mode. The full power mode signal of each processor may be separately monitored and/or one or more combination processor power signals may be monitored.

The high voltage (e.g., 12 Volts) flash-programming supply voltage may burn a significant amount of power when turned on. The software may activate the high voltage flash-programming supply, perform a write operation, and then proceed to other tasks without properly turning off the high supply voltage after the write operation is completed, thus unnecessarily consuming power. A more complex reason for power consumption may be poor management of the timing and/or clustering of flash programming. Although this process typically should be intelligently co-managed by the operating system and the application code, many applications are built with memory management errors that co-manage flash memory in a sub-optimal manner.

A flash write indication signal may also be monitored indicating that a flash-memory write operation is occurring. Actually performing a flash-memory write operation consumes much more power than just the high supply voltage being turned on. It may be advantageous, however, to track both for statistical monitoring.

The cache-miss bus cycle in progress signal may indicate consumption of a significant amount of power. Any bus access that misses in all internal buffers and caches information inherently activates a significant amount of circuitry. The activated circuitry includes not only the destination memories, but also toggling long and high-capacitance bus nets, as well as switching circuitry in crossbar switches, address decoders and related circuitry, all of which consume considerable energy. Too many cache misses can indicate a problem as simple as running a given algorithm on a core with too little cache, or having been compiled with the wrong optimization settings. This indication may also mean, however, that the system requires fundamental algorithmic improvements.

The PI signals may also include one or more signals indicating operation of general purpose DMA controllers. DMA controllers often have bandwidth controls to control power consumption. Sometimes, however, a DMA controller is "reactive" in nature, in which the more it gets behind, the more it cranks up its bandwidth usage, and thus the more power it consumes. This can make operation of the DMA controller less predictable than expected, making statistics of how often the DMA controller is operating at what bandwidth setting useful power consumption information. DMA controllers are usually the most power-efficient way to move data. Therefore, unfortunately, too much DMA activity may indicate a need to substantially redesign the data flow within a system, such as to eliminate extraneous intermediate destinations.

Many market-driven SOCs have specialty controllers, such as special-purpose network interfaces or controllers for performing super-precisely-timed actions or the like. These special-purpose interface blocks can consume considerable power, so any signal indicating activation of one or more of these blocks can provide useful power consumption information.

Many SOCs are broken down into various power domains that can be separately powered up or down on the fly. A power domain being turned on or off can have considerable effect upon power consumption. A power domain that is unnecessarily left turned on while not performing useful work may waste a significant amount of power.

An external bus access (e.g., DRAM access) in progress signal indicates significant power consumption. Accesses to even medium-sized DRAM arrays consume a significant amount of power. The controllers for DRAM are typically SOC-internal (e.g., located on the IC 100), with the DRAM itself usually, but not always, off-chip (such as located within the external system 113). A system that has too many external DRAM accesses may consume more power than necessary. Often this problem may be solved by remapping frequently accessed external data to more power efficient on-chip memory (e.g., memory 105).

External I/O pins, including general purpose I/O pins or I/O pins carrying hardware control signals, may be monitored to identify power usage. Hardware that is external to the IC 100 may consume a significant level of power rather than the IC 100. An SOC, for example, may have Parallel I/O (PIO) pins to control external hardware. One common example of a high-power-consumption external device, often controlled by a PIO pin, is the backlight of a liquid crystal display (LCD). Power usage of such external devices may be internally monitored statistically via one or more such PIO pins. The determination that the IC 100 is not the primary cause of excessive power consumption, but is instead an external device or system, is valuable information in the effort to optimize power utilization.

Figure 2:
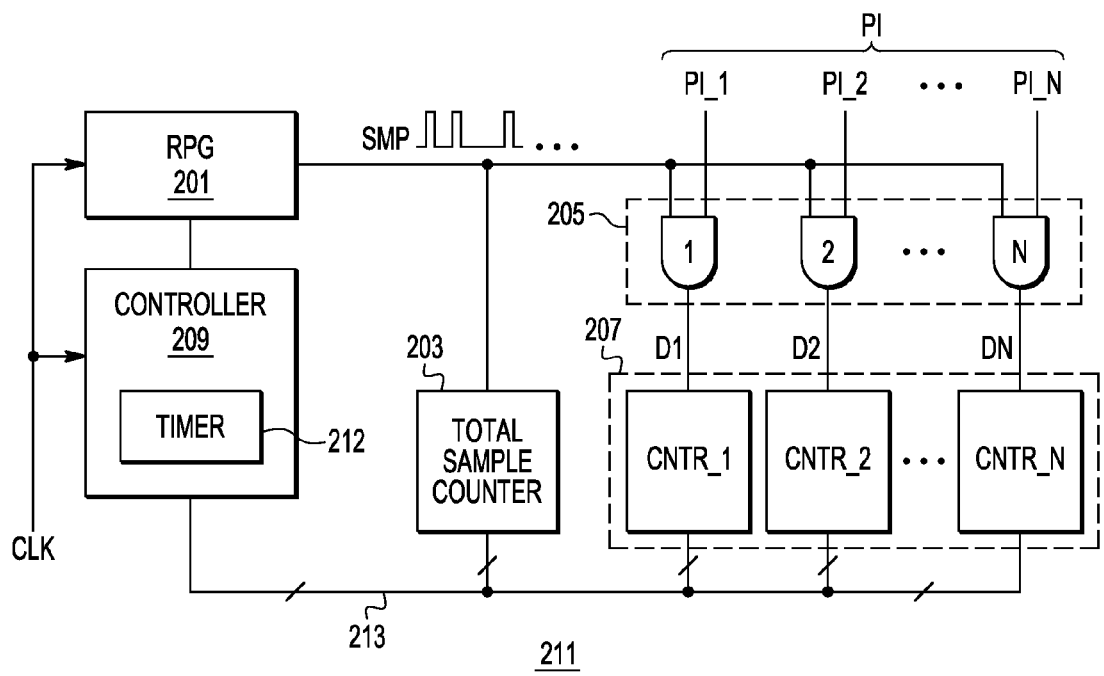
FIG. 2 is a simplified block diagram of an SPIM according to one embodiment that may be used to implement the SPIM of FIG. 1.

FIG. 2 is a simplified block diagram of an SPIM 211 according to one embodiment that may be used to implement the SPIM 111. A random pattern generator (RPG) 201 develops random signal assertions on a sample signal SMP, in which each assertion of SMP denotes a sample event. The SMP signal may be a binary signal with two states, low and high. In one embodiment, the signal being in the asserted state (herein defined to be the high state, but could alternatively be defined as the low state) coincident with the rising edge of a clock signal indicates that a sample is to be taken. In an alternative embodiment, the signal assertion means that the SMP signal transitions from low to high or from high to low (or otherwise transitions between states), and that transition directly causes sampling to occur without regard to a clock signal.

The SMP signal is provided to an input of a total sample counter 203 and to one or more inputs of detect logic 205. In the illustrated embodiment, the detect logic 205 includes a series of "N" logic AND gates, each having one input receiving the SMP signal, in which "N" is a positive integer. The use of AND gates in this embodiment assumes that the PI signals, the SMP signal, and the outputs of those gates are all defined to be asserted (logically true) when in the high state. An alternate embodiment may define these signals for different active states, and will therefore have a different gate type. However the active levels are defined though, the gate performs an ANDing function, its output being in the chosen asserted state only when all of its inputs are in the chosen asserted state. The PI signals are shown as a set of N individual signals PI_1, PI_2, . . . , PI_N, each provided to the other input of a corresponding one of the AND gates of the detect logic 205. The output of each AND gate provides a corresponding one of N detection signals D1, D2, . . . , DN (D1-DN), which is provided to the input of a corresponding one of N individual counters CNTR_1, CNTR_2, . . . , CNTR_N (CNTR_1-CNTR_N) of power signal counter logic 207.

A controller 209 is provided for controlling statistical monitoring operation, and is coupled to control the RPG 201, and is further coupled to the total sample counter 203 and each of the counters of the power signal counter logic 207 via an interface 213 including one or more signals (which may be implemented as the system interface 101). For example, the controller 209 may be configured to read count values stored in the total sample counter 203 and each of the counters of the power signal counter logic 207 after a statistical monitoring operation, and then to clear the counters for a subsequent operation. In another embodiment, the external debugger 115 is used to retrieve the total sample counter 203 and power signal counter logic 207 values. CLK is shown provided to the RPG 201 and to the controller 209.

The total sample counter 203 may be configured with the option of "saturating" in which it stops counting when it reaches a maximum count value. In this manner, it may be used to indicate that the statistical information may not be accurate since indicating an overflow condition. Also, it may be configured to generate an interrupt or the like to stop gathering statistics if and when the maximum value is reached. The gathering of statistics can be configured to be automatically stopped when the maximum value is reached.

In operation of the SPIM 211, the controller 209 controls statistical monitoring operation including starting and stopping operation for a sample time interval while the application system 150 is operated according to normal operation or for a predetermined set of operations. The controller 209 initiates operation by initiating the RPG 201 and, if desired, by clearing the total sample counter 203 and each of the individual counters of the power signal counter logic 207. It is noted that a separate, register-based control bit may be used instead to clear the counters on demand, such as before starting or arming the SPIM 211 for operation. Alternatively, the user, via the external debugger 115, or software running on the processors 103, may clear the counters by explicitly writing zeros to them. While the application system 150 is operating, the controller 209 then activates the RPG 201 and the timer 212 to initiate the sample time interval. After a statistical monitoring operation is completed, count values stored in the total sample counter 203 and each of the individual counters of the power signal counter logic 207 may by retrieved and stored. If it is desired to accumulate statistics for multiple operations, then the contents of the counters may not be cleared until the overall monitoring operation is completed.

In one embodiment, the controller 209 includes a programmable timer 212 or the like that is programmed with a time value indicative of the sample time interval. The timer 212, for example, may be implemented as a down-counter that is programmed with the time value such that when initiated by the controller 209, counts down until it reaches zero (or timeout). Alternatively, a comparator that compares the total sample count value of the total sample counter 203 with a predetermined count value may be used for terminating an operation. Alternatively, sampling could be stopped by the user writing to a control register bit for that purpose, or by an event detected by the debugger 115.

The RPG 201 operates by asserting randomly-timed pulses on the SMP signal during the sample time interval, in which each pulse denotes assertion of the SMP indicating a sample event. The total sample counter 203 counts the total number of assertions of SMP during the sample time interval. Each of the counters CNTR_1-CNTR_N counts the number of times that a corresponding one of the detect signals D1-DN is asserted indicating assertion of a corresponding one of the PI_1-PI_N signals coincident with the SMP assertions during the sample time interval. When the sample time interval is completed, such as when the timer 212 times out, the controller 209 optionally pauses the RPG 201, and the count values within the total sample counter 203 and each of the counters CNTR_1-CNTR_N of the power signal counter logic 207 may be retrieved and stored by external test logic or the like, such as the external debugger 115 and viewed directly by the user via any suitable test apparatus. The total sample counter 203 and the counters CNTR_1-CNTR_N may be mapped into memory or the I/O space of a processor 103 via the system interface 101 for convenient retrieval by the debugger 115 or by CPU software or other means.

The SPIM 211 (replacing the SPIM 111 within the application system 150) thus gathers statistical information about power usage of the application system 150. Each of the PI_1-PI_N signals, when asserted to a logic high, indicates that a corresponding device or circuit block or system within the application system 150 is powered up and consuming power. For example, PI_1 may be a processor full power mode indicator, PI_2 may represent the flash programming voltage supply being on, PI_3 may indicate that a large clock domain on the IC 100 is enabled, PI_4 may indicate an external memory access is in progress, etc. The sample time interval may be a significant amount of time, such as several seconds, minutes, or even hours of operation, so that each of the count values stored in the counters CNTR_1-CNTR_N of the power signal counter logic 207, when divided by the total count value stored in the total sample counter 203, indicates the relative, statistical percentage of time that the corresponding one of the PI_1-PI_N signals indicates that a corresponding device, component or system is turned on or activated during the sample time interval.

In this manner, the SPIM 211 gathers a statistical percentage of time that each circuit or system of the application system 150 is powered up during operation. This statistical percentage of time information may then be compared to the application designer's design criterion or power budget to determine whether or not the application system 150 is operating in the manner intended from a power consumption standpoint. As previously stated, many applications (maybe most) initially tend to exceed the estimated or target power budget, and the specific causes of excessive power consumption are not easily determinable using conventional techniques. However, the statistical percentage of time information gathered by the SPIM 211, combined with a table of power high power indications by each PI signal, may be used to quickly identify the most substantial and least-expected sources of excessive power consumption, or at least to rule out suspected sources of power consumption.

If it is determined, for example, that a particular CPU is fully powered up and operating at full frequency for a higher percentage of time than desired or intended, then the firmware or software may be modified to remedy this condition. In a multiple processor configuration, for example, if CPU 4 is intended to be activated only 5% of the time or less, and the statistical percentage of time information indicates that CPU 4 is on 50% of the time or more, then power may be reduced by adjusting operation to ensure that the CPU 4 is turned off or placed in a low power mode when not in use. Or, if it is determined that 2 or more or even 3 or more processors are turned on simultaneously for a large percentage of time, the operating system scheduler may be adjusted to load-balance less, and instead cluster processes more onto a smaller set of processors, so that more processors may be shut down completely more often. Alternatively or in addition, if memory indications or operations indicative of excessive power consumption, such as excessive activation of the high-voltage flash programming supply voltage, excessive occurrences of cache memory misses, excessive operation of DMA, excessive external bus accesses to external memory, etc., then memory management operation may be adjusted to conserve power. Alternatively or in addition, if excessive hardware activations, such as excessive activation of specialty controllers, power domains, external hardware, etc., are detected, then hardware control operations may be adjusted to reduce or otherwise minimize hardware operations.

Periodic sampling of various circumstances has been attempted, which was performed by asserting CPU interrupts and having the interrupt routines gather statistics. The act or process of measuring in this manner, however, changes that which is being measured, which invalidates those measurements. In contrast, a SPIM as described herein may be implemented with an economical amount of hardware, and can measure more signals and be unobtrusive to the normal operation of the application. Furthermore, being unobtrusive, statistical power indication monitoring as described herein may then be repeated in subsequent monitoring operations to determine whether operation modification successfully reduces power to achieve the target or expected or at least minimized power budget.

Sampling timing of statistical power indication monitoring as described herein is aperiodic. Computer systems almost always have many periodicities in their operation. These periodicities are caused by factors such as timers in task schedulers, communication-protocol or video-frame timing, and looping in the application software. Whatever the source of the periodicity, it is not uncommon for power consumption to be, for example, consistently higher at the start and lower at the end, of these periodic intervals. Since there are many such periodicities in a typical system, it is easy for periodic sampling to unintentionally and unexpectedly sample repeatedly when the instantaneous power consumption is high, or when it is low. Therefore, periodic sampling may distort the statistics.

Figure 3:
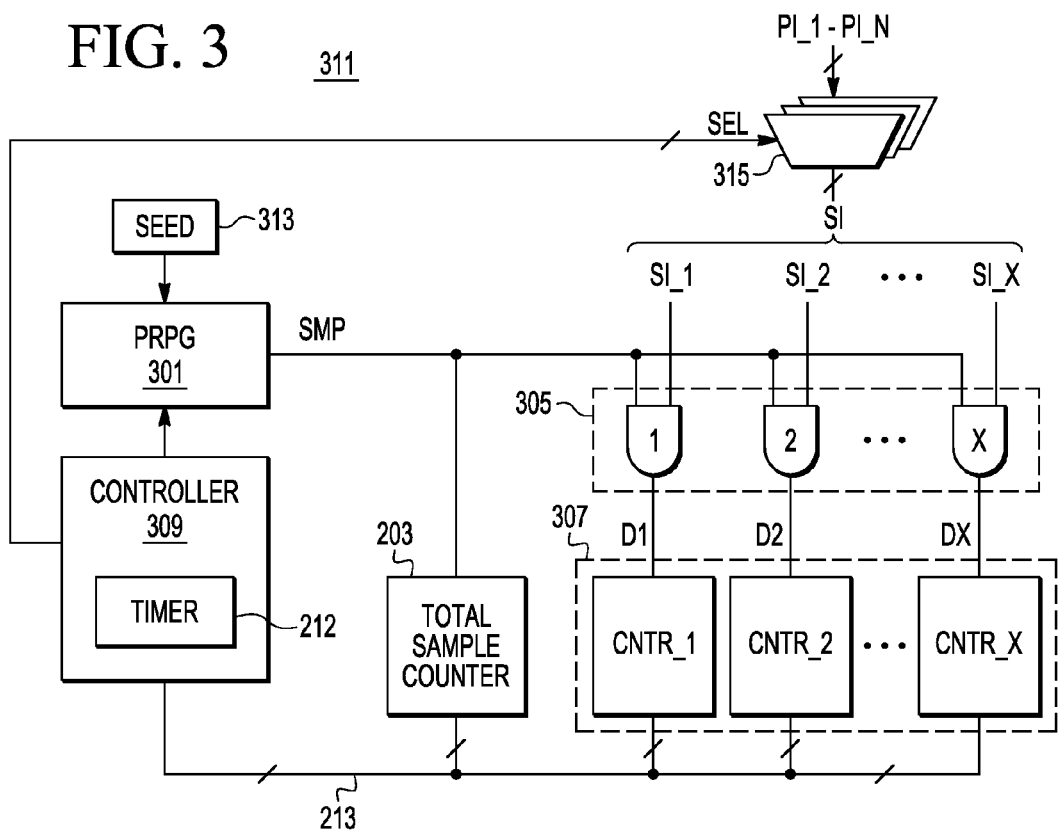
FIG. 3 is a simplified block diagram of an SPIM according to another embodiment that may also be used as the SPIM of FIG. 1.

FIG. 3 is a simplified block diagram of an SPIM 311 according to another embodiment that may also be used as the SPIM 111. The SPIM 311 is similar to the SPIM 211, except that the RPG 201 is replaced by a pseudo random pattern generator (PRPG) 301, the detect logic 205 is replaced by detect logic 305, the counter logic 207 is replaced by counter logic 307, select logic 315 is added, such as implemented with at least one multiplexer (MUX) or the like, and the controller 209 is replaced by a similar controller 309 including the timer 212 in similar manner. The controller 309 is coupled to control and/or read count values of the total sample counter 203 and the individual one or more counters of the counter logic 307 via the interface 213 or the system interface 101.

The PI_1-PI_N signals are provided to inputs of the select logic 315, which outputs a selected subset "X" number of PI signals, shown as X signals SI, individually named SI_1, SI_2, . . . , SI_X (SI_1-SI_X). The number "X" is also a positive integer, which may be less than N and may even be unity or "1" for a single sample counter CNTR_1 (even though multiple counters are shown). The detect logic 305 and the counter logic 307 are similar to the detect logic 205 and the counter logic 207, respectively, except including only X components rather than N components for processing a corresponding number X signals. Thus, the detect logic 305 includes X logic AND gates providing X detection signals D1-DN to the counter logic 307, which includes X individual counters CNTR_1, CNTR_2, . . . , CNTR_X (CNTR_1-CNTR_X), each for counting assertions of a corresponding one of the detection signals D1-DX. As with detect logic 205, the AND gates assume that the logically true (asserted) values for their inputs and logically true output is a 1. The logic function may be adjusted appropriately if the inputs or output are defined to be asserted as a zero. Further, a memory device 313, such as a register or the like, receives and stores a programmable SEED value used to program the PRPG 301. If the PRPG 301 is mapped into memory or I/O space, then the programmable SEED value could alternatively be maintained by software, or by the user, and directly written into the PRPG 301.

The programmable SEED value can be used to simplify the hardware configuration and provide an added feature and benefit of repeatability. The reuse of the same seed value for a pseudo-random pattern generator allows sample timing to be "replayed" exactly every time a measurement is taken, while the sampling is still effectively random. Repeatability is advantageous by providing a means of duplicating monitoring activities after correcting power-consumption issues that the SPIM discovers, to verify that the changes to the application system 150 reduced power consumption. Repeatability further provides a means of reducing the number of counters needed for measuring each of the PI signals. For example, a first subset of PI signals may be selected in a first session, a second subset may be selected in a second session using the same set of counters, and so on, in which the results in the counters for each session are stored in separate memory for storing full results of a monitoring session. In this manner, the overall number of counters may be reduced and/or the size (e.g., length) of the counters may be increased to provide longer and more accurate monitoring operations.

For exact repeatability, however, in most usages, the SPIM 311 must be started and stopped at precise times, and all inputs to the application must be identical. Repeatability is especially valuable if the counters 307 and total sample counter 203 are made small to reduce cost. In those cases, with a comparatively small number of samples being taken, results are more consistent or relatable between monitoring sessions if they are taken with identical timing.

Sampling on a seeded pseudo-random pattern basis, starting and stopping at precisely controlled times, can also be useful in precisely the opposite way. In order to improve statistical accuracy, the same time period of execution can be repeated multiple times with different, rather than identical, pseudo-random seed values. This guarantees that samples are taken at different times in each run. Averaging the statistics from each such run improves statistical accuracy. This is especially useful if the total sample counter 203 and counters 307 are limited in maximum count value, for cost reduction, and if more-precise statistics are needed.

Operation of the SPIM 311 is similar to that of the SPIM 211, except that the controller 309 first loads the SEED value into the PRPG 301 before initiating a monitor operation, which may include one or more operating sessions. A different SEED value enables a different sequence of pseudo-random pulses on the SMP signal. Keeping the original SEED value, however, reproduces the same original sequence of pseudo-random pulses on the SMP signal to be applied, thus providing repeatability. The controller 309 also asserts one or more select signals SEL to select inputs of the select logic 315 for selecting a subset of the PI_1-PI_N signals for a given monitoring session. The SEL value could be as simple as a constant value programmed into a register by the user. In this manner, the controller 309 may select the same SEED value and the same sample time interval for each subset of the PI_1-PI_N signals to reduce the number of counters of the counter logic 307 (e.g., X<N). In fact, X may be "1" in which a single counter is used, in which the select logic selects one of the PI_1-PI_N signals at a time and the controller 309 repeats substantially the same monitoring session N times for the overall monitoring operation. As previously described, the use of select logic and repeatability reduces the number of counters or allows for a smaller set of deeper counters for more accurate monitoring over longer periods of time. After each monitoring session, the count values in the counters 203 and CNTR_1-CNTR_X are retrieved and stored for analysis.

Figure 4:
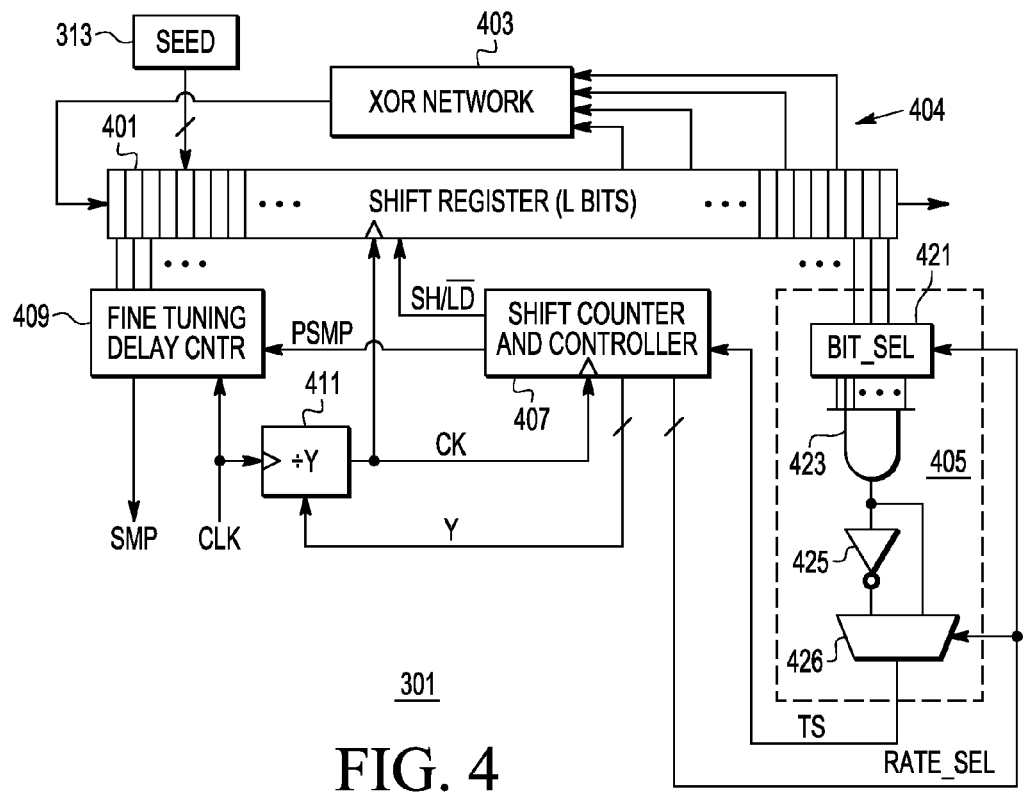
FIG. 4 is a block diagram of the PRPG of FIG. 3 according to one embodiment.

FIG. 4 is a block diagram of the PRPG 301 according to one embodiment. The PRPG 301 may also be used instead of the RPG 201 of the SPIM 211, in which the controller 209 is modified accordingly to control the PRPG 301, such as controlling loading of a SEED value or the like. In the illustrated embodiment, the PRPG 301 includes a shift register 401, an exclusive-OR (XOR) network 403, sample select logic 405, a shift counter and controller 407, a fine tuning delay counter 409, and a clock divider 411. The shift register 401 and the XOR network 403 may be collectively referred to what is known in the art as a Linear Feedback Shift Register (LFSR) 404, with the XOR network 403 being determined by a "primitive polynomial" forms one possible implementation of this type of PRPG. The subsequent description assumes this implementation, although other implementations are also possible.

The shift register 401 may be implemented in any suitable or standard manner. The shift register 401 has a length of "L" bits, in which "L" is a positive integer greater than one. In one embodiment, L is 32 bits, although any suitable number of bits may be used. In one embodiment, for example, the shift register 401 may include a set of L series-coupled D-type flip-flops (DFFs) or the like, in which each DFF is clocked by a frequency-divided clock signal CK. The shift counter and controller 407 provides a signal shift/load (SH/$\overline{\text{LD}}$) to control operation of the shift register. The shift counter and controller 407 asserts the SH/$\overline{\text{LD}}$ signal high for normal shift operation, and low to load the shift register 401 with the SEED value. Select logic (not shown), such as multiplexers, may be placed between the DFFs to select between the shift and load operations based on the SH/$\overline{\text{LD}}$ signal. In this manner, the SEED value stored in the memory device 313 may be loaded in a single, parallel load operation into the shift register 401 when SH/$\overline{\text{LD}}$ is low, and shift operation proceeds when SH/$\overline{\text{LD}}$ is high.

In an alternative embodiment, the shift register 401 may be a memory mapped register, such as mapped into the memory space of the memory 105. The SEED value may be loaded into the register simply by storing the SEED value at the corresponding memory address of the memory mapped register. The SEED value is described as being loaded in a parallel manner, but may alternatively be shifted in serially from the memory device 313 to the shifter register 401.

An LFSR is generally a shift register whose input bit is a linear function of its previous state. The XOR network 403 has 2 or more inputs receiving selected bits of the shift register 401 and an output which is fed back into an input of the shift register 401. For example, the inputs of the XOR Network 403 are the Q outputs of selected shift-register DFFs of the shift register 401, in which the XOR network 403 performs the linear function of selected bits of the shift register 401. Beyond preferably representing a primitive polynomial, in general, the greater L is, the more shift-register bits go into the XOR network 403, and the more evenly distributed those bits are, the less predictable will be the timing of the SMP signal. The linear function it performs is such that, each time it is shifted L bits, the value in the shift register 401 forms the remainder of a binary polynomial division, conducted without carry.

The sample select logic 405 may be fixed or programmable, in which the illustrated configurations shows a programmable embodiment. The shift counter and controller 407 provides a digital rate select (RATE_SEL) value to a BIT_SEL block 421 within the sample select logic 405. In general, based on the RATE_SEL value, the BIT_SEL block 421 selects one or more bits of the shift register 401 and provides the selected bits to corresponding inputs of an AND gate 423. Although depicted as selecting from the highest-order bits of the shift counter and controller 407, the BIT_SEL block 421 may be configured to select arbitrarily from the bits from lowest to highest and may further select any number of bits based on desired sample rate resolution as further described herein. Generally, once the shift register 401 is shifted L bits, programming how many bits go into the AND gate 423 is more important than which particular bits, since the content of the shift register 401 is pseudo-random.

The output of the AND gate 423 provides a preliminary "take sample" signal, which is provided to an input of an inverter 425 and to one input of a MUX 426. The output of the inverter 425 provides an inverted take sample signal, which is provided to the other input of the MUX 426. One bit of the RATE_SEL value is provided to the control input of the MUX 426, having its output providing a take sample or TS command signal to an input of the shift counter and controller 407. In general, the sample select logic 405 is programmable to select a statistical rate of samples over time while maintaining pseudo-random operation. Although AND-type logic is depicted, alternative and more complex logic configurations may be used for providing greater sample resolution control, if desired. For example, the same ultimate effect could alternatively be achieved by a NAND gate, OR gate, or NOR gate. Furthermore, the AND gate 423 or its equivalent may be used without the inverter 425 or MUX 426, if the resulting statistical sampling frequencies are within an acceptable range.

In operation of the sample select logic 405, assume first that the MUX 426 directly selects the output of the AND gate 423. If only a single bit is selected by the BIT_SEL block 421, then TS is asserted high or low based on the binary value of the selected bit. In this manner, the probability of TS being high for any given clock cycle is 50% (or 0.5) for a single selected bit. If two bits are selected by the BIT_SEL block 421, then the probability is decreased to 0.25 since both bits must be high for TS to go high. Each time the number of selected bits is increased by one, the probability is divided by two (e.g., 0.5, 0.25, 0.125, 0.0625, . . . ).

When, however, the MUX 426 selects the output of the inverter 425, then the AND gate 423 together with the inverter 425 collectively performs a NAND logic function of the bits selected by the BIT_SEL block 421. If only a single bit is selected, then once again the probability of TS being high for any given clock cycle is 0.5 for a single selected bit. If two bits are selected by the BIT_SEL block 421 for the NAND function, then the probability is increased to 0.75 since TS is high as long as either bit is low. If 3 bits are selected for the NAND function, then the probability is increased to 0.875, and so on (e.g., 0.5, 0.75, 0.875, 0.9375 . . . ).

The RATE_SEL therefore adjusts the rate of sample pulse assertion of the TS signal based on the adjustment of probability, which ultimately adjusts the statistical rate of assertions of the SMP signal.

The TS signal is provided to an input of the shift counter and controller 407, which outputs a preliminary sample signal PSMP to an input of the fine tuning delay counter 409. The fine tuning delay counter 409 receives the PSMP signal, takes inputs from a selected number of bits of the shift register 401, and outputs sample pulses on the sample signal SMP. The fine tuning delay counter 409, unlike most of the rest of the circuitry, is clocked by the high-frequency system clock CLK. The clock divider 411 receives the system clock CLK and a clock divider value Y and outputs the divided clock signal CK to a clock input of the shift counter and controller 407 and to a clock input of the shift register 401. The shift counter and controller 407 may provide the divider value Y, which is a positive integer value. Alternatively, Y could be a constant, hard-wired value, or unchanging value programmed by the user. In an alternative embodiment, the entire PRPG 301 may be clocked on a single clock, which is equivalent to Y=1.

The divider value Y may be regarded as a programmable "prescaler" value to control the rate of shifting of the shift register 401. The Y and RATE_SEL values collectively determine the overall rate of sample pulses on the SMP signal. In one embodiment, Y may be 16, though it may be any other suitable value for controlling the sample rate. It is noted that prescaling is useful since few applications require extremely-frequent sampling, and also to reduce the frequency of operation, and thus the cost and power-consumption. Although frequent sampling is typically not needed, full-clock-rate timing resolution of the sampling is still important. The fine tuning delay counter 409 allows the full timing resolution, and thus full timing randomness, of the sample, with a much lower operating frequency for the majority of the SPIM circuitry.

In operation of the PRPG 301, the user programs the SEED value, the clock pre-scale value Y as the candidate-sample rate, and the RATE_SEL value. The initial programming may be managed by the controller 309. The shift counter and controller 407 asserts SH/$\overline{LD}$ low to load the SEED value into the shift register 401, and then asserts SH/$\overline{LD}$ high to initiate shift operation of the shift register 401. During shift operation, the shift counter and controller 407 passes the value of TS to the value of PSMP every "L" CK cycles. In one embodiment, the shift counter and controller 407 gates the value of TS to PSMP to pass every $L^{th}$ value of TS as the PSMP signal. The value "L" is the number of bits of the shift register 401, so that only selecting every $L^{th}$ value of TS optimizes randomness of the LFSR 404. It is noted that the PSMP signal provides a preliminary sample pulse only when the $L^{th}$ value of TS is asserted.

When PSMP is asserted, the fine tuning delay counter 409 inserts a delay based on the selected set of bits of the shift register 401 and the CLK signal, and then asserts a pulse on SMP. Although the selected bits are shown beginning at the lower end of the shift register 401, any arbitrarily selected bits and any number of bits of the shift register 401 may be selected to implement the random delay function, provided that the selected delay does not exceed the time between pulses on the TS signal. In one embodiment, the fine tuning delay counter 409 comprises or otherwise includes a timer or counter or the like, which is clocked by the system clock CLK. For example, the selected bits collectively form a digital value stored in a down counter of the fine tuning delay counter 409, in which the down counter decrements with CLK cycles and asserts the pulse on SMP when the counter counts down to zero. The fine tuning delay counter 409 performs a "fine" tuned delay based upon the fact that CLK is typically faster than CK by the divider factor Y (assuming Y is not unity), and upon the fact that shift register 401 is typically clocked L times (with the 1/Y frequency clock, CK) to produce a new pseudo-random value.

In one embodiment, the selected number of bits provided to the fine tuning delay counter 409 is fixed based on the number of bits "L" of the shift register 401. In another embodiment, the divider value Y is provided to the fine tuning delay counter 409, which then adjusts the number of selected bits of the shift register 401 based on Y and L. For example, if L is 32 bits and Y is a divider value of 16, then there is one potential sample every 512 cycles of the faster system clock CLK. The fine tuning delay counter 409 multiplies 32 by 16 to determine 512 and selects the number of bits "B" so that $2^B$=512, or B=9. B bits of pseudo-random data are therefore taken from shift register 401 to define a delay value. In this manner, the delay varies from 0 to 511 cycles of CLK. Since the selected bits generally form an arbitrary or "pseudo-random" number, the fine tuning delay counter 409 inserts a random delay based on spacing of potential sample pulses. So, the PSMP signal defines whether or not a sample will in fact be taken within that particular 512-clock interval, whereas the fine tuning delay counter 409 defines precisely when within that interval the sample will be taken.

In an alternate embodiment, the fine tuning delay counter 409 receives its delay value from a PRPG (or RPG) separate from the PRPG 301 that provides the pseudo-random-sampling information to the sample select logic 405.

Operation continues until stopped by the controller 309 as previously described. The shift counter and controller 407 has been described as gating (or ignoring) assertions of TS and only selecting every $L^{th}$ value of TS to maximize the randomness of the LSFR 404. Alternatively, the number of shifts between selecting TS values may be reduced to increase the number of samples at the expense of reduced randomness. Although the number of shifts may be reduced to unity (1, rather than L), the randomness may be significantly reduced thereby increasing the probability of synchronization with periodicities of the system. Also, a reduced number of shifts may degrade the function of the sample select logic 405, especially for a larger number of consecutive bits of the shift register 401. The shift register 401 can be shifted at least by the greater of the number of bits selected by the BIT_SEL block 421 and the fine tuning delay counter 409. If the shift register 401 is not shifted the full L bits per candidate sample time, then there may be a slight benefit for the bits used by the fine tuning delay counter 409 and the BIT_SEL logic 421 to be lower in the shift register 403 since the lower-order bits are more recently randomized by the XOR network 403.

The illustrated embodiment shows the RATE_SEL and Y values provided by the shift counter and controller 407. One or both of these values may instead be fixed values. Alternatively, these values may be provided by another controller, such as the controller 209 or 309 or the like, or may be programmed into a memory mapped control register or the like. Furthermore, a "manual" start/stop bit may also be provided by a memory mapped control register. Starting or stopping the application may be facilitated via address detection triggers from Nexus/Debug registers or the like, in which case the "manual" start/stop bit becomes an "arm" bit to enable that mechanism. This feature is valuable for ensuring repeatable sampling from the same initial seed value, since, to be repeatable, it must be started and stopped at exactly the same time on each measurement run.

Figures 5, 6:
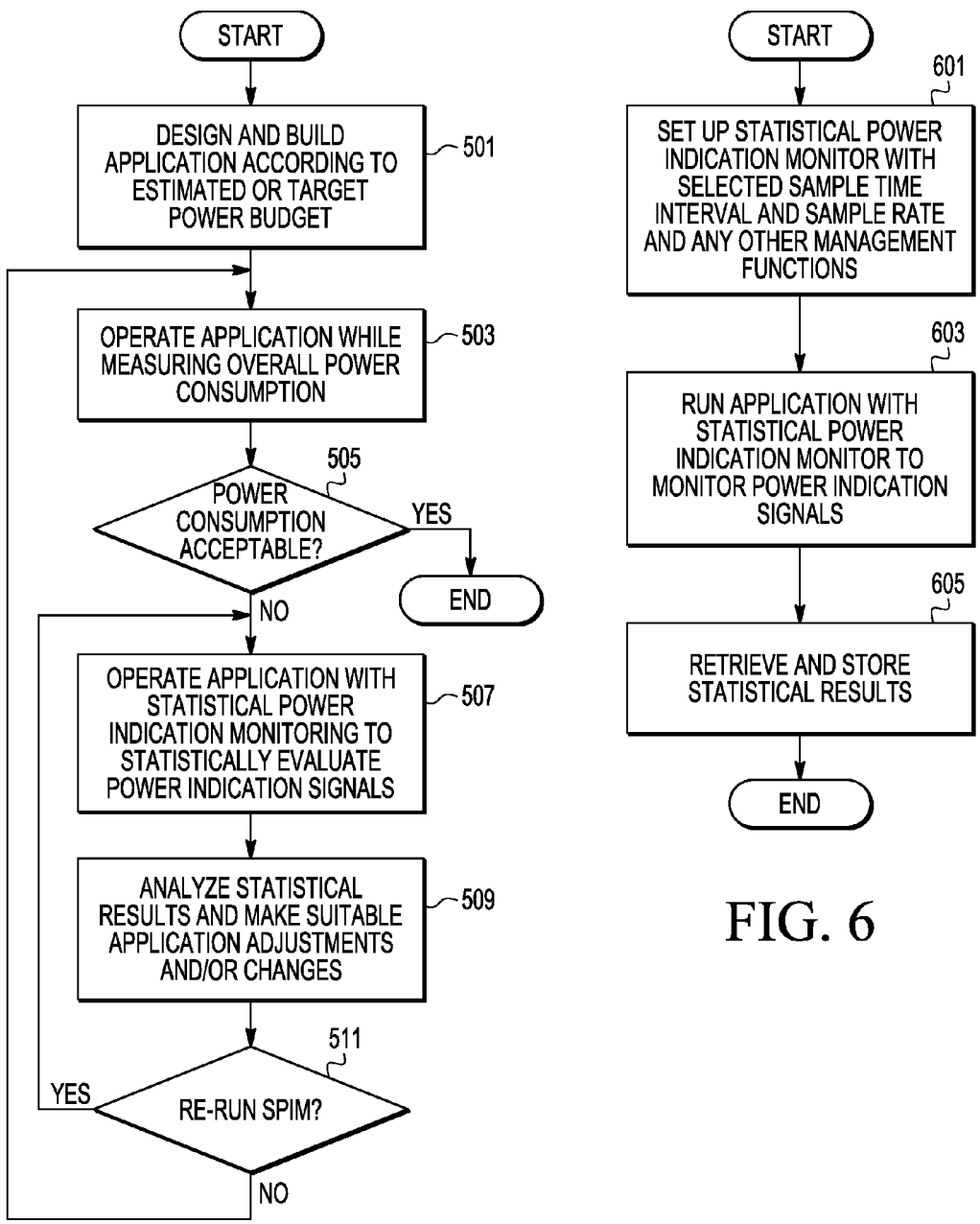
FIG. 5 is a flowchart diagram illustrating operations that may be performed by a user for implementing an application, such as the application of FIG. 1, and evaluating its power consumption.
FIG. 6 is a flowchart diagram providing further detail of the statistical power indication monitoring operations of FIG. 5.

FIG. 5 is a flowchart diagram illustrating operations that may be performed by a user for implementing an application, such as the application system 150, and evaluating causes of its power consumption. At a first block 501, the user designs and builds the application system (including hardware and the various forms of software, such as firmware) according to an estimated or predetermined target power budget. At next block 503, the user operates the application while measuring overall power consumption. There are many systems or methods for measuring overall power consumption, such as by tracking total current and voltage over time. At next block 505, it is queried whether the power consumption is acceptable for the application. In general, if the estimated or predetermined target power budget is met, then the power consumption may be deemed acceptable and operation is completed.

In many cases (if not most cases), the power budget is exceeded, particularly for complex designs, initial product introductions, and/or newer applications in competitive markets. Also, even if the original power budget is met, it may be desired nonetheless to further evaluate power consumption to determine if greater optimization of power usage may be achieved. If so, operation advances to block 507 in which the application is operated with statistical power indication monitoring according to embodiments described herein to statistically evaluate the power indication signals for at least one monitoring operation. For example, the statistical analysis may be used to identify unexpected power consumers in the system. Operation then advances to block 509 in which the statistical results are analyzed and corresponding suitable application changes and/or adjustments are made. Although, in block 509, the SPIM rapidly points to the most valuable places to look for power-management bugs, traditional debug techniques may be more likely to reveal the specific details of what is going wrong.

As previously described, the count values stored in the counters (e.g., counters CNTR_1-CNTR_X) associated with the PI signals PI_1-PI_N are each divided by the total sample count number from the total sample counter 203 to determine the statistical percentage of time that a corresponding system or function is activated or powered on during the selected time interval. In many cases this statistical information enables identification of problems or errors in operation, such as leaving certain systems activated when not in use or when not actually performing those systems' functions. The adjustments are usually in the form of firmware and/or software changes and adjustments to correct the identified problems or errors in the operation of the application.

After such adjustments are made, operation proceeds to block 511 to query whether to re-run the statistical power indication monitoring to statistically evaluate the power indication signals. In this manner, the relative success of the adjustments may be evaluated. Operation may loop between blocks 507, 509 and 511 for as many times as desired until sufficiently improved operation is achieved. It is noted that repeatability is particularly advantageous for more accurate comparison between different statistical results of successive monitoring operations since substantially the same sequence of pseudo-random samples may be generated for each monitoring session of each monitoring operation. In addition, or in the alternative, operation loops back to block 503 to operate the application again while monitoring overall power consumption after the adjustments have been made. It may be desired to avoid measuring power consumption with the SPIM operating, because the SPIM may consume a not-insignificant amount of power that would not be consumed in normal operation of application system 150. Once power consumption is acceptable as determined at block 505, operation is completed.

It is noted that in some cases, acceptable power consumption may not be achieved with adjustments to the application through firmware or software changes or the like. In some cases, larger system function overhauls may be necessary. Or worse, certain more significant system revisions including hardware changes or revisions may be necessary to achieve desired power consumption goals. But even so, application power monitoring as described herein quickly provides valuable indications to determine the appropriate changes necessary.

FIG. 6 is a flowchart diagram providing further detail of block 507 for each statistical power indication monitoring operation as described herein. At first block 601, the statistical power indication monitor (e.g., SPIM 211 or 311) is set up with selected sample time interval and sample rate. For example, the timer 212 of the controller 209 is programmed with the proper value for establishing the sample time interval. Also, for the PRPG 301, a suitable SEED value is programmed, along with the programmable values for Y and RATE_SEL and any other parameters for selecting a suitable sample rate.

The sample time interval and sample rate are interdependent along with the number and length (e.g., maximum count) of the counters. If a relatively long sample time interval is chosen, then the sample rate may be programmed to provide a suitable number of total samples while avoiding the risk of over-running any of the counters. Additional monitoring management functions are also established. For the SPIM 311, for example, operation of the SEL signal is determined to select the set of PI signals to evaluate each of multiple monitoring sessions. The monitoring management function also manages storage of the count values after each session. Furthermore, operation of the application system 150 is established. Monitoring may begin from power up or reset for a suitable amount of time, or monitoring is initiated and terminated during certain operational conditions or system events, such as detected by the debugger 115.

Operation then proceeds to block 603 in which the application is run or executed along with the statistical power indication monitor to monitor the PI signals. During operation, or after each monitoring session, the statistical results are retrieved and stored as shown at block 605. As previously described at block 509, such statistical results are analyzed to determine the appropriate adjustments or changes to the application to improve power efficiency.

A statistical power indication monitor as described herein enables a user to easily determine why an application may be consuming more power than estimated or desired. A statistical power indication monitor as described herein is easy to understand and operate, is inexpensive to implement within a wide variety of ICs, and is unobtrusive. A statistical power indication monitor as described herein may be implemented with circuitry that consumes very little space and power and is operated only when it is desired to identify power utilization. The PI signals are easily identified as those which IC designers know how to involve high power usage within the IC, or those that a user knows to indicate power consumption external to the IC. These PI signals are easily routed or otherwise made available to the statistical power indication monitor, which provides an easy and efficient means to monitor these signals. A statistical power indication monitor as described herein employs random or pseudo-random sampling to avoid synchronizing with any periodicities of the application and thus to provide accurate statistical power indication monitoring results.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" or the like are used to arbitrarily distinguish between the elements such terms describe. Thus, these terms are not necessarily intended to indicate temporal or other prioritization of such elements.

The invention claimed is:

1. A circuit, comprising:
   a plurality of components, each asserting at least one of a plurality of power indication signals when power is being consumed by a corresponding one of said plurality of components; and
   a statistical power indication monitor, comprising:
      a random pattern generator that generates a plurality of randomly-timed assertions of a sample signal;
      a total counter that counts a total number of assertions of said sample signal within a sample time interval;
      detect logic that receives at least one of said power indication signals and said sample signal and that provides at least one detection signal, wherein each of said at least one detection signal is asserted when a corresponding power indication signal is asserted coincident with an assertion of said sample signal; and
      counter logic that counts a number of assertions of each of said at least one detection signal during said sample time interval.

2. The circuit of claim 1, wherein said detect logic comprises at least one logic AND gate, and wherein each said logic AND gate has a first input receiving said sample signal, has a second input receiving a corresponding one of said plurality of power indication signals, and has an output providing a corresponding one of at said at least one detection signal.

3. The circuit of claim 1, wherein said circuit further comprises select logic that provides a subset number of said plurality of power indication signals to said detect logic, and wherein said detect logic provides said subset number of power indication signals to said power indication counter logic.

4. The circuit of claim 1, wherein said random pattern generator comprises a pseudo random pattern generator.

5. The circuit of claim 1, further comprising delay logic that inserts a randomly generated delay of each of said plurality of randomly-timed assertions based on a selected subset of bits of a linear feedback shift register.

6. The circuit of claim 1, wherein said random pattern generator comprises:
a linear feedback shift register;
sample select logic that generates a plurality of assertions of a take sample signal based on at least one bit of said linear feedback shift register; and
a controller that gates selected ones of said plurality of assertions of a take sample signal for providing said plurality of randomly-timed assertions.

7. The circuit of claim 6, further comprising:
bit select logic that selects a plurality of bits of said linear feedback shift register based on a rate control value from said controller; and
combination logic that logically combines said plurality of bits of said linear feedback shift register to develop said plurality of assertions of said take sample signal.

8. The circuit of claim 7, further comprising:
said combination logic comprising at least one logic gate providing a preliminary take sample signal;
an inverter receiving said preliminary take sample signal and providing an inverted take sample signal;
rate select logic that selects between said preliminary take sample signal and said inverted take sample signal based on said rate control value; and
wherein said rate control value is selected for controlling a rate of said plurality of assertions of said take sample signal.

9. The circuit of claim 6, further comprising:
a programmable clock divider that divides a frequency of a system clock and that outputs a divided clock for clocking said linear feedback shift register; and
a delay counter clocked by said system clock that delays each of said plurality of randomly-timed assertions based on a digital count value comprising a selected subset of bits of said linear feedback shift register.

10. The circuit of claim 6, wherein:
said linear feedback shift register has a length of L bits and is clocked by a clock signal; and
wherein said controller comprises a shift counter that asserts said sample signal for each $L^{th}$ cycle of said clock signal if said take sample signal is also asserted.

11. The circuit of claim 6, wherein said controller programs said linear feedback shift register with a duplicate seed value for generating a duplicate plurality of randomly-timed assertions for each of a plurality of monitoring operations.

12. The circuit of claim 1, wherein said plurality of power indication signals is selected from a group consisting of:
at least one processor power mode signal indicating a power level of at least one processor;
at least one signal indicative of a memory operation;
a memory voltage supply signal;
a cache miss bus cycle progress signal;
at least one power domain active indicator;
at least one signal indicative of power consumption of an external device; and
at least one input/output signal of the circuit.

13. A method of statistically monitoring power indications of a circuit, comprising:
asserting at least one of a plurality of power indication signals when a corresponding one of a plurality of components is consuming power;
generating a plurality of randomly-timed assertions on a sample signal;
counting a total number of the plurality of randomly-timed assertions within a sample time interval; and
counting a number of times each of at least one of the plurality of power indication signals is asserted coincidentally with the plurality of randomly-timed assertions of the sample signal during the sample time interval.

14. The method of claim 13, wherein said generating a plurality of randomly-timed assertions on a sample signal comprises:
generating a plurality of assertions of a take sample signal based on at least one bit of a linear feedback shift register; and
gating the plurality of assertions of the take sample signal to provide the plurality of randomly-timed assertions on the sample signal.

15. The method of claim 14, further comprising randomly delaying each of the plurality of randomly-timed assertions on the sample signal based on a selected number of bits of the linear feedback shift register.

16. The method of claim 14, further comprising controlling a rate of the plurality of randomly-timed assertions on the sample signal by logically combining a selected number of bits of the linear feedback shift register and controlling a clock rate of the linear feedback shift register.

17. The method of claim 14, wherein said gating the plurality of assertions of the take sample signal comprises selecting from among the plurality of assertions of the take sample signal based on a bit length of the linear feedback shift register.

18. The method of claim 13, wherein said generating a plurality of randomly-timed assertions on a sample signal comprises:
programming a linear feedback shift register with a seed value; and
dividing a frequency of a system clock signal to provide a divided clock signal for clocking the linear feedback shift register.

19. The method of claim 13, further comprising:
programming a seed value into a pseudo random pattern generator for generating a first plurality of randomly-timed assertions on the sample signal for a first sample time interval;
storing a first total number of randomly-timed assertions on the sample signal during the first sample time interval; and
storing a first count value for a first power indication signal for the first sample time interval.

20. The method of claim 19, further comprising:
programming the same seed value into the pseudo random pattern generator for generating the same first plurality of randomly-timed assertions on the sample signal for a second sample time interval having a duration that is equal to a duration of the first sample time interval;
determining a second total number of randomly-timed assertions on the sample signal during the second sample time interval; and
determining a second count value for at least one of a first power indication signal and a second power indication signal for the second sample time interval.

* * * * *